United States Patent
Ramachandran et al.

(10) Patent No.: US 8,255,450 B2
(45) Date of Patent: Aug. 28, 2012

(54) DISPLAY OF END-TO-END PHYSICAL LAYER SIGNAL FLOW

(75) Inventors: Vidhyaprakash Ramachandran, Richardson, TX (US); Kamran Zia Khan, Plano, TX (US); Sugandha Venkatachalam, Plano, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 669 days.

(21) Appl. No.: 11/943,067

(22) Filed: Nov. 20, 2007

(65) Prior Publication Data

US 2009/0132928 A1 May 21, 2009

(51) Int. Cl.
*G06F 15/16* (2006.01)
*G06F 3/00* (2006.01)

(52) U.S. Cl. ........ 709/200; 709/223; 709/224; 715/733; 715/735; 715/738; 715/739

(58) Field of Classification Search .................. 709/200; 715/736

See application file for complete search history.

(56) References Cited

U.S. PATENT DOCUMENTS

| | | | | |
|---|---|---|---|---|
| 4,223,977 A * | 9/1980 | Papuchon et al. | ............... | 385/14 |
| 6,829,438 B2 * | 12/2004 | Liu et al. | .......................... | 398/83 |
| 7,295,775 B2 * | 11/2007 | Bisson et al. | ................... | 398/33 |
| 7,310,774 B1 * | 12/2007 | Arquie et al. | ................. | 715/734 |
| 7,386,231 B2 * | 6/2008 | King et al. | ...................... | 398/27 |
| 7,475,131 B2 * | 1/2009 | Achiwa et al. | ................ | 709/223 |
| 8,045,853 B2 * | 10/2011 | Gerstel et al. | ................... | 398/32 |
| 2003/0115319 A1 * | 6/2003 | Dawson et al. | ................ | 709/224 |
| 2004/0098474 A1 * | 5/2004 | Galou et al. | .................... | 709/223 |
| 2004/0151494 A1 * | 8/2004 | King et al. | ...................... | 398/16 |
| 2004/0172466 A1 * | 9/2004 | Douglas et al. | ............... | 709/224 |
| 2006/0188252 A1 * | 8/2006 | Schluter | ........................ | 398/25 |
| 2008/0131126 A1 * | 6/2008 | Gerstel et al. | ................... | 398/79 |

* cited by examiner

*Primary Examiner* — Haresh N Patel
*Assistant Examiner* — Linglan Edwards

(57) ABSTRACT

A device may include a client. The client may be configured to send a request for a physical view about network devices that connect two end points of a network path. In addition, the client may be configured to receive information about the network devices of the network path in response to the request, the information including a complete list of physical devices in the network path in accordance with the request for the physical view. Further, the client may be configured to display the complete list of the physical devices in order the physical devices connect the two end points.

18 Claims, 12 Drawing Sheets

DISPLAY OF END-TO-END PHYSICAL LAYER SIGNAL FLOW

BACKGROUND INFORMATION

If a remote network operator detects a failure in a network, without cross referencing a number of different databases and/or component information, the network operator may be unable to identify the point of failure (e.g., the failed circuit). Without the ability to pinpoint the component that has failed, the operator may be unable to assess the level of impact the failure may have on network operations, determine other devices or systems that may be impacted by the failed component, or decide on a proper course of action in response to the problem (e.g., let the network recover).

DETAILED DESCRIPTION OF PREFERRED EMBODIMENTS

The following detailed description refers to the accompanying drawings. The same reference numbers in different drawings may identify the same or similar elements.

As used herein, the term "physical device" may refer to an actual physical device in the physical layer of the Open Systems Interconnection (OSI) reference model.

The term "physical view," as used herein, may refer to a graphical representation of physical devices in a graphical user interface (GUI) window. A particular physical view may show physical devices that share a set of characteristics, traits, or properties.

In the following, a client application may show connectivity of network elements in the physical layer of the Open Systems Interconnection (OSI) reference model. The client application may show the of different types of devices and/or systems, such as cables, fibers, or components that relay signals at a specified wavelength, optical systems, and/or transmission systems, based on path information that the client application receives from a server application.

The server application may obtain the path information by intelligently applying constraints on different physical factors, such as physical locations of devices, types of devices, architecture of the devices, interconnections of components in the devices, bandwidths/wavelengths associated with the devices, etc. For example, the server application may obtain the path information by retrieving a list of interconnecting components of a device, trace a path to one end of a cable that meets bandwidth requirements, locate a component that is at the other end of the cable, and identify the device that includes the component. The obtained path information may be sent to the client application to be displayed.

Figure 1:
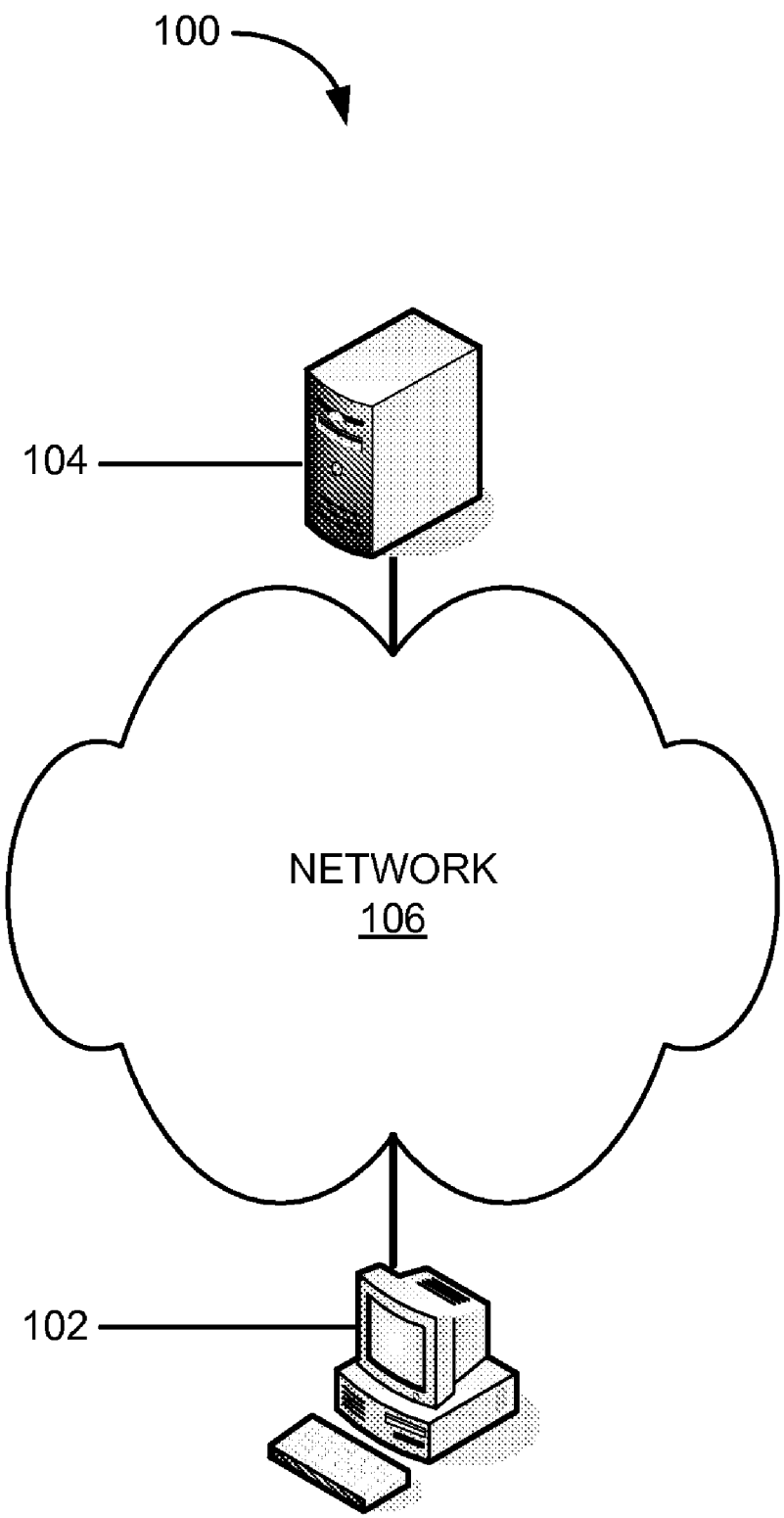
FIG. 1 shows a network in which concepts described herein may be implemented.

FIG. 1 shows an exemplary network in which concepts described herein may be implemented. As shown, network 100 may include a client device 102, a server device 104 and a network 106. In other implementations, network 100 may include more, fewer, or different components. For example, network 100 may include many client devices. Moreover, one or more components of network 100 may perform one or more functions of another component of network 100. For example, client device 102 may perform functions that are associated with server device 104.

Client device 102 may include one or more computer systems for hosting client programs and/or applications. Client device 102 may include, for example, a personal computer (e.g., desktop or laptop); an electronic notepad; a personal digital assistant (PDA) that can include a radiotelephone, pager, Internet/intranet access, or web browser; or another type of computation or communication device.

Server device 104 may include one or more computer systems for hosting server programs and/or applications. Server device 104 may receive a request for uploading or downloading applications and/or data from client applications that may be hosted by client device 102, may process the request, and may transmit or receive data to and from client device 102.

Network 106 may include the Internet, an ad hoc network, a local area network (LAN), a wide area network (WAN), a metropolitan area network (MAN), a cellular network, a public switched telephone network (PSTN), an optical fiber network (e.g., a synchronous optical network (SONET)) any other network, or a combination of networks. Client device 102 and/or server device 104 may connect to network 106 via wireless or wired communication links.

Figure 2:
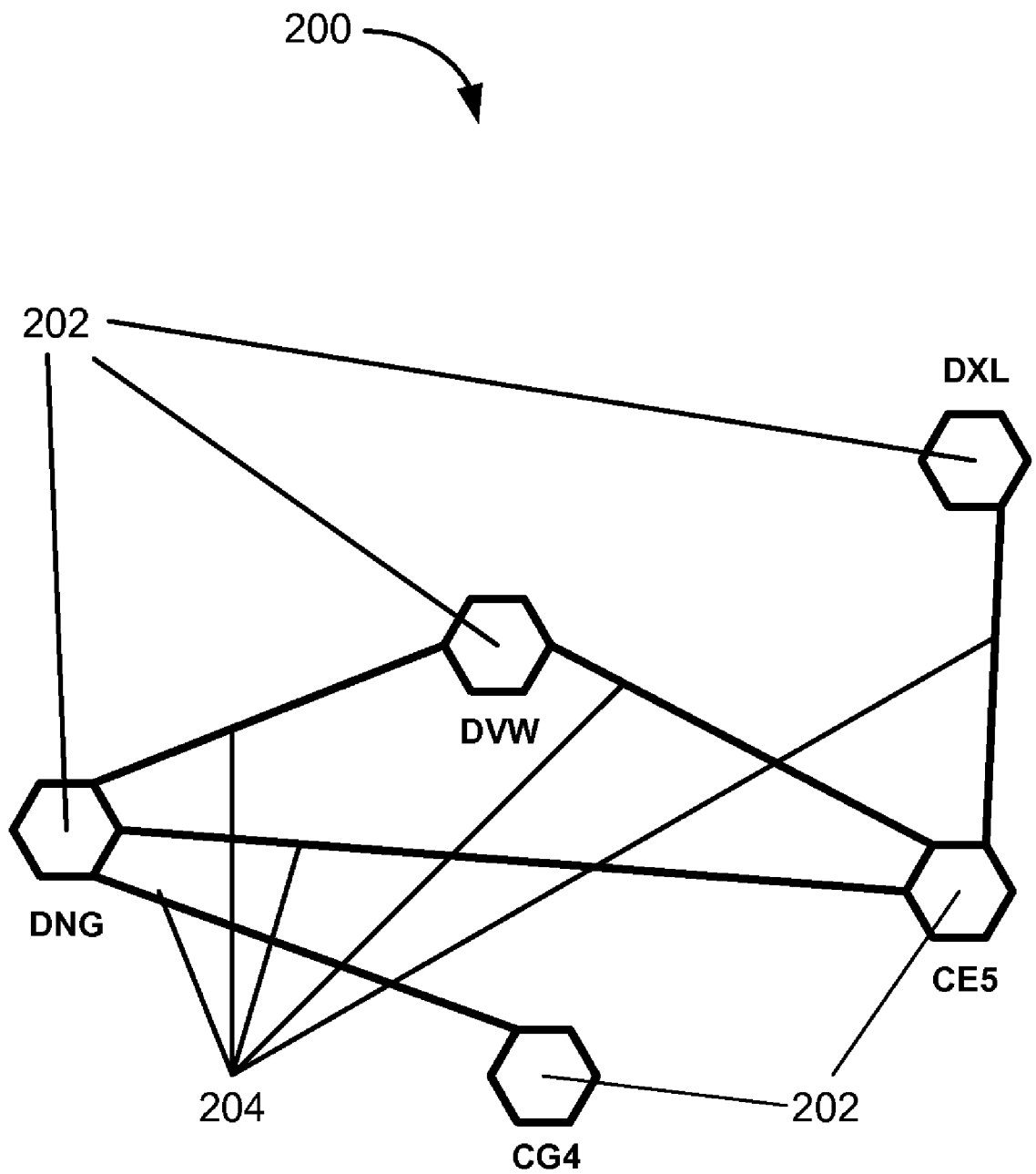
FIG. 2 shows an optical network of FIG. 1.

FIG. 2 shows an example of an optical network 200 that may be included in network 106. As shown, optical network 200 may include optical systems 202 and paths 204. Each of optical systems 202 may one or more devices such as an add-drop multiplexer, a regenerator, an optical cross-connect, a terminal multiplexer, etc. Paths 204 may include optical fibers and/or cables that interconnect systems 202.

Figure 3:
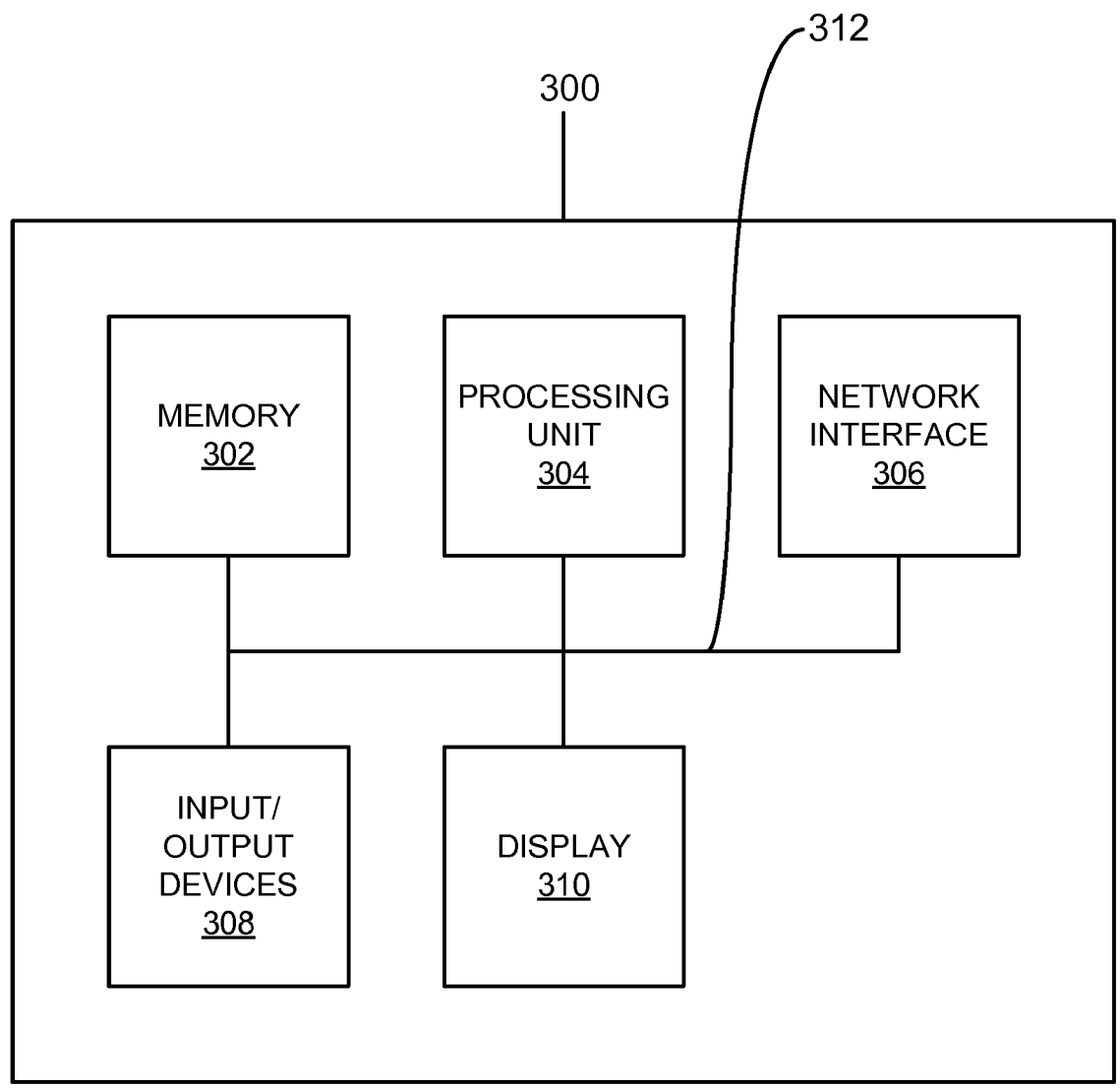
FIG. 3 is a block diagram of an exemplary device of FIG. 1.

FIG. 3 shows a block diagram of an exemplary device 300. Device 300 may represent client device 102 and/or server device 104. As shown, device 300 may include memory 302, a processing unit 304, a network interface 306, input/output devices 308, a display 310, and a bus 312. Depending on implementation, device 300 may include additional, fewer, or different components than those shown in FIG. 3. For example, if device 300 is implemented as client device 102, device 300 may include a pair of speakers. In another example, if device 300 is implemented as server device 104, device 300 may include disks that can quickly process large quantities of data.

Memory 302 may include static memory, such as read only memory (ROM), and/or dynamic memory, such as random access memory (RAM) or onboard cache, for storing data and machine-readable instructions. Memory 302 may also include storage devices, such as a floppy disk, CD ROM, CD read/write (R/W) disk, and/or flash memory, as well as other types of storage devices. Processing unit 304 may include one or more processors, microprocessors, and/or processing logic capable of controlling device 300.

Network interface 306 may include any transceiver-like mechanism that enables device 300 to communicate with other devices and/or systems. For example, network interface 306 may include mechanisms for communicating via a network, such as the Internet, a terrestrial wireless network a satellite-based network, a SONET, etc. Such mechanisms may include, for example, a synchronous optical network (SONET) interface, a wireless local area network (WLAN) interface, a Bluetooth interface, a Universal Serial Bus (USB) interface, etc. Additionally or alternatively, network interface 306 may include an Ethernet interface to a local area network (LAN), and/or an interface/connection for connecting device 300 to other devices (e.g., a Bluetooth interface).

Input/output devices 308 may include one or more of a keyboard, a mouse, a speaker, a microphone, a Digital Video Disk (DVD) writer, a DVD reader, Universal Serial Bus (USB) lines, and/or other types of devices for converting physical events or phenomena to and/or from digital signals that pertain to device 300.

Display 310 may include a device that can display signals generated by device 300 as text or images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.) and a touch screen or a panel-enabled display that may function as a user input interface. For example, display 310 may include a pressure-sensitive (e.g., resistive), near field-sensitive (e.g., capacitive), acoustically-sensitive (e.g., surface acoustic wave), photo-sensitive (e.g., infra-red), and/or any other type of display overlay that allows display 310 to be used as an input device.

Bus 312 may provide an interface through which components of device 300 can communicate with one another.

Figure 4:
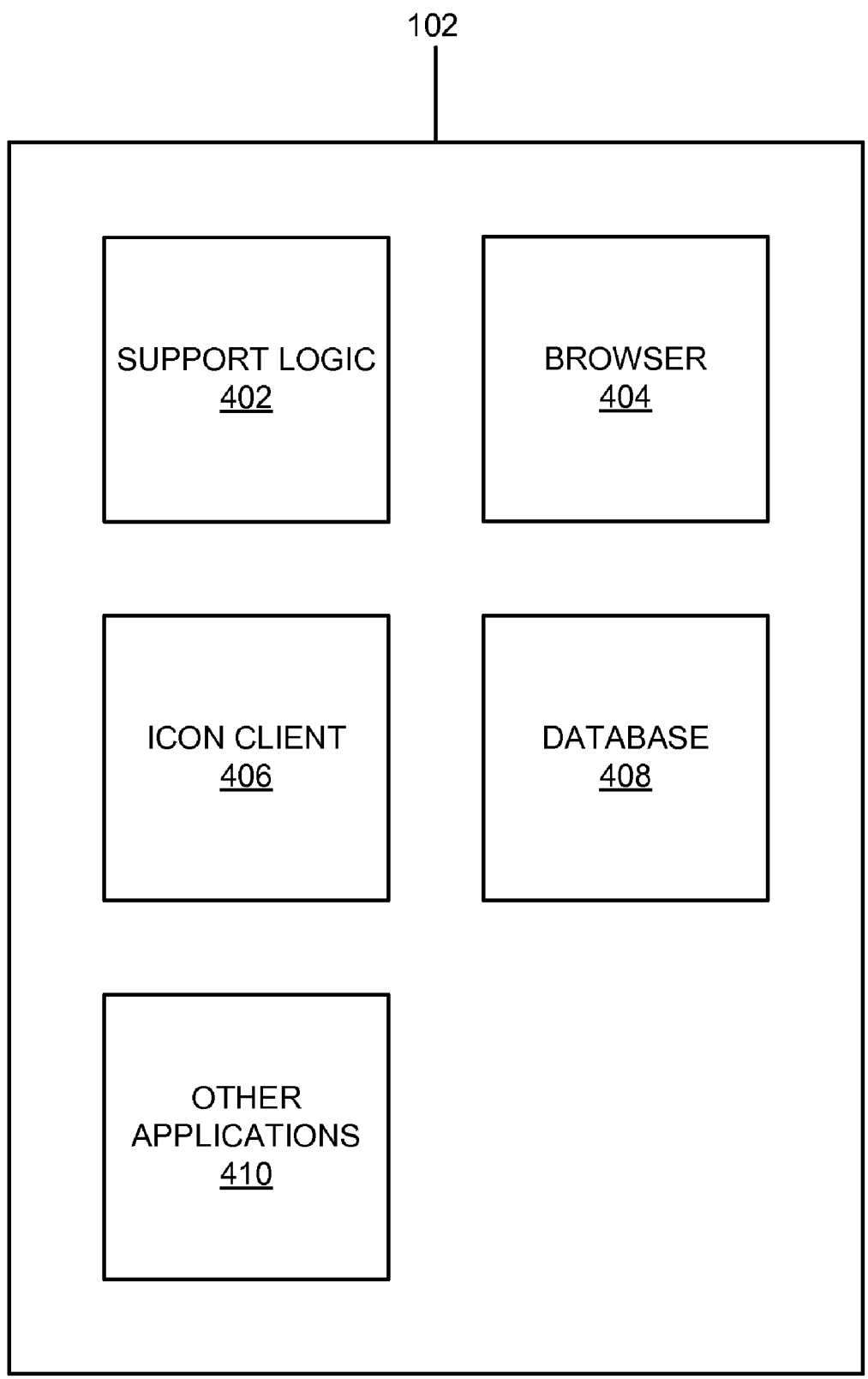
FIG. 4 is an functional block diagram of an exemplary client device of FIG. 1.

FIG. 4 is a functional block diagram of an exemplary client device 102. As shown, client device 102 may include support logic 402, a browser 404, an Integrated Configuration of Networks (ICON) client 406, a database 408, and other applications 410. Depending on implementation, client device 102 may include fewer, additional, or different types of components than those illustrated in FIG. 4. For example, in one implementation, client device 102 may exclude database 408.

Support logic 402 may include hardware and/or software for performing various support functions for other components in FIG. 4 (e.g., browser 404, ICON client 406, etc.). For example, support logic 402 may provide interfaces between the components illustrated in FIG. 4 (e.g., browser 404) and the components in FIG. 3 (e.g., network interface 306). In yet another example, support logic 402 may provide a Transmission Control Protocol (TCP)/Internet Protocol (IP) stack to support communication applications, such as browser 404. Browser 404 may include a software application that allows a user to interact with web resources at websites or hosts. A user at client device 102 may use browser 404 to submit and receive information to and from server device 104.

ICON client 406 may include hardware and/or software for interacting with server device 104 for creating, editing, and displaying end-to-end physical layer network connectivity. In many implementations, ICON client 406 may be implemented as a browser plug-in that attaches itself to browser 404 at browser startup and operates in conjunction with browser 404. In other implementations, ICON client 406 may be implemented as a stand-alone application. Database 408 may act as an information repository for other components of client device 102. For example, ICON client 306 may retrieve and/or store information about a network 106 to/from database 408.

Other applications 410 may include hardware and/or software for supporting various functionalities of client device 102, such as instant messaging, receiving and sending email messages, playing video, performing wireless communications, etc.

Figure 5:
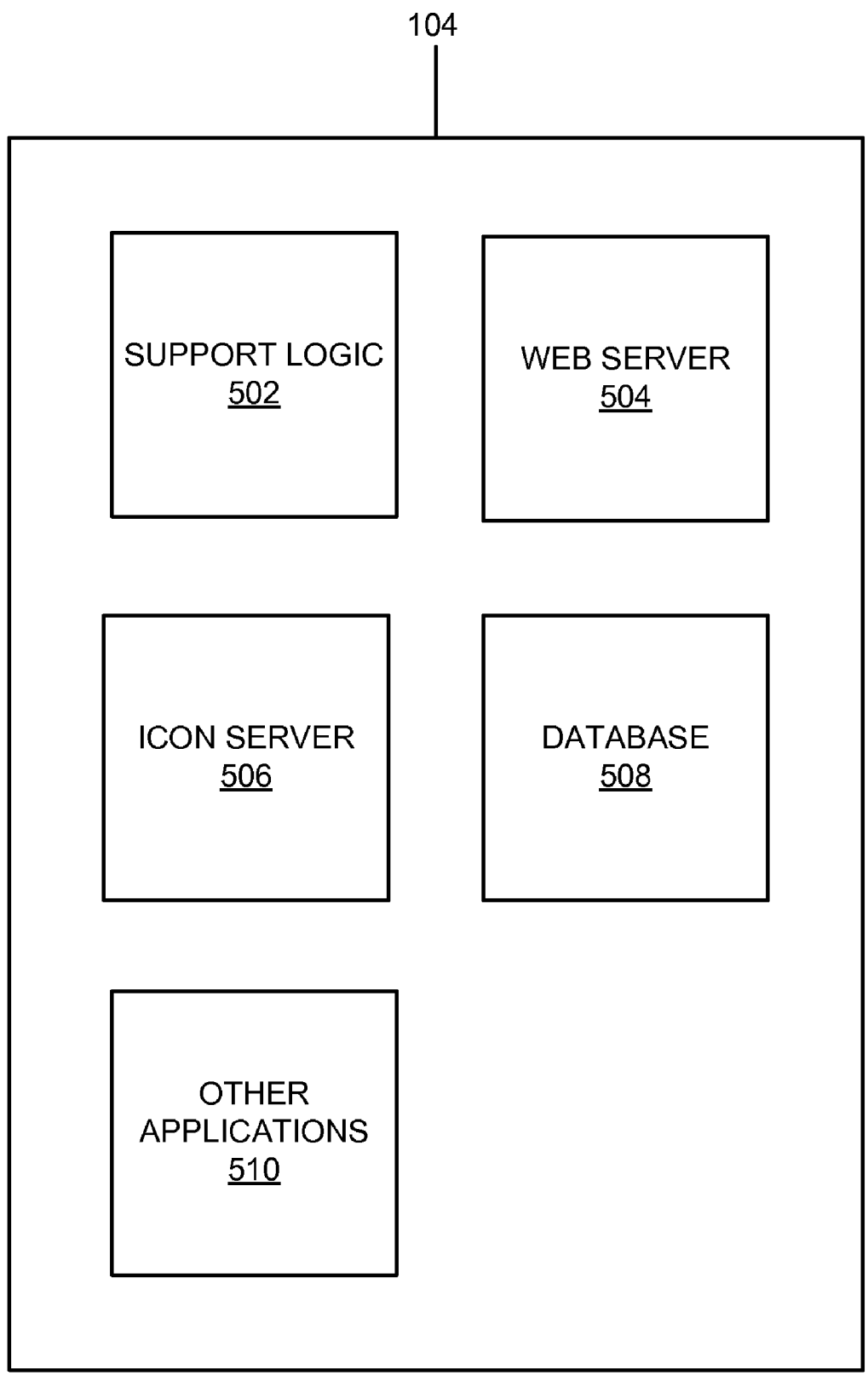
FIG. 5 is an functional block diagram of an exemplary server device of FIG. 1.

FIG. 5 is a functional block diagram of an exemplary server device 104. As shown, server device 104 may include support logic 502, a web server 504, an ICON server 506, a database 508, and other applications 510. Depending on implementation, server device 104 may include fewer, additional, or different types of components than those illustrated in FIG. 4. For example, in one implementation, server device 104 may exclude web server 504.

Support logic 502 may include hardware and/or software for performing various support functions for other components in FIG. 5 (e.g., web server 504, ICON server 506, etc.). For example, support logic 502 may provide interfaces between the components illustrated in FIG. 5 (e.g., web server 504) and the components in FIG. 3 (e.g., network interface 306). In yet another example, support logic 502 may provide a TCP/IP stack to support communication applications, such as web server 504.

Web server 504 may include hardware and/or software for receiving information from client applications such as browser 404 and for sending web resources to client applications. In exchanging information with client devices and/or applications, web server 504 may operate in conjunction with other components, such as database 508 and/or other applications 510.

ICON server 506 may include hardware and/or software for interacting with ICON client 406 of client device 102 and providing ICON related services. More specifically, ICON server 506 may retrieve data/records about one or more network elements and relay the data/records to ICON client 406. In addition, ICON server 506 may receive data/records about one or more network p from ICON client 406 and use the data/records to update database 508. In some implementations, ICON server 506 may exchange information with ICON client 406 through web server 504, and in other implementations, ICON server 506 may exchange information directly with ICON client 406. ICON server 506 may be implemented as a stand-alone server application, as server side scripts (e.g., Java Server pages (JSP)), servlets, and/or Enterprise Java Beans (EJB) that are generally used with application servers.

In addition, ICON server 506 may obtain information that is related signal paths by intelligently applying constraints on different physical factors, such as interconnections of components in network devices, physical locations of the devices, types of the devices, architecture of the devices, bandwidths/wavelengths that are supported by the components/devices, etc. More specifically, a signal traversal module may trace a signal path from one point in a network to another, based on component interconnections, architectures of devices, bandwidths of the devices/components, etc. For example, the signal traversal module may determine an output port in one device, a cable that is connected to the output port, an input port that is connected to the same cable, another device that includes the input port, and other output ports that carries signals from the other device, etc. The obtained path information may be sent to ICON client 406 to be displayed. In some implementations, this functionality of ICON server 506 may be included in ICON client 406, instead of ICON server 506.

Database 508 may act as an information repository for other components of device 104. For example, web server 506 may retrieve web pages and/or information from, or store web pages and/or information to, database 508. In another example, ICON server 506 may retrieve and/or store information about networks to/from database 508.

In one implementation, database 508 may store ICON records related to network components and network configurations. The ICON records may be arranged as a database table that can be searched based via database queries (e.g., structured query language (SQL) queries), as indexed files, or as other types of data structures. Each ICON record may describe a device, a cable, or a system, its relationship to other devices/cable/system, and/or other device characteristics. For example, a record may include a network equipment identifier, a target identifier (e.g., a number assigned to a device in a given system), a physical location identifier, a device type identifier, an identifier for the system in which the device is hosted, a port number, a multiplexer-level (e.g., physical or logical level at which a device multiplexes a signal), and/or an optical position code (e.g., a direction at which an optical device is positioned). Additionally, the record may include information about subcomponents of the device/system to which the record pertains, about hosts which may include the device/system, and about components to which the device/system may be interconnected. In other implementations, the record may include fewer, additional, or different types of fields, such as the name of device manufacturer, the date of last repair and/or installation, the date of a previous failure, its operational state (e.g., active, standby), etc.

Other applications 510 may include hardware and/or software for supporting various functionalities of server device 104, such as application server functions, text messaging, email, Multimedia Messaging, wireless communications, web access, file uploading and downloading, image transfer, etc. If application servers are included in other applications 510, the applications servers may support Enterprise Java Beans (EJBs) and operate in conjunction with Java server pages (JSPs), servlets, and/or web server 504.

In some implementations, other applications 510 may include or support an element management system (EMS), a network management system (NMS), and/or agents that communicate with an EMS or a NMS. If the OSI layer 2 or 3 network information is collected at the EMS or NMS via various network management protocols (e.g., Simple Network Management Protocol (SNMP)), such information may be integrated as part of the ICON records in database 508. In other implementations, data that is entered to create the ICON records may be exported to the EMS or NMS for other network related functionalities, such as fault isolation and/or switching from a failed path to a protection path in an automatic protection switching (APS) system for SONET devices.

Figure 6:
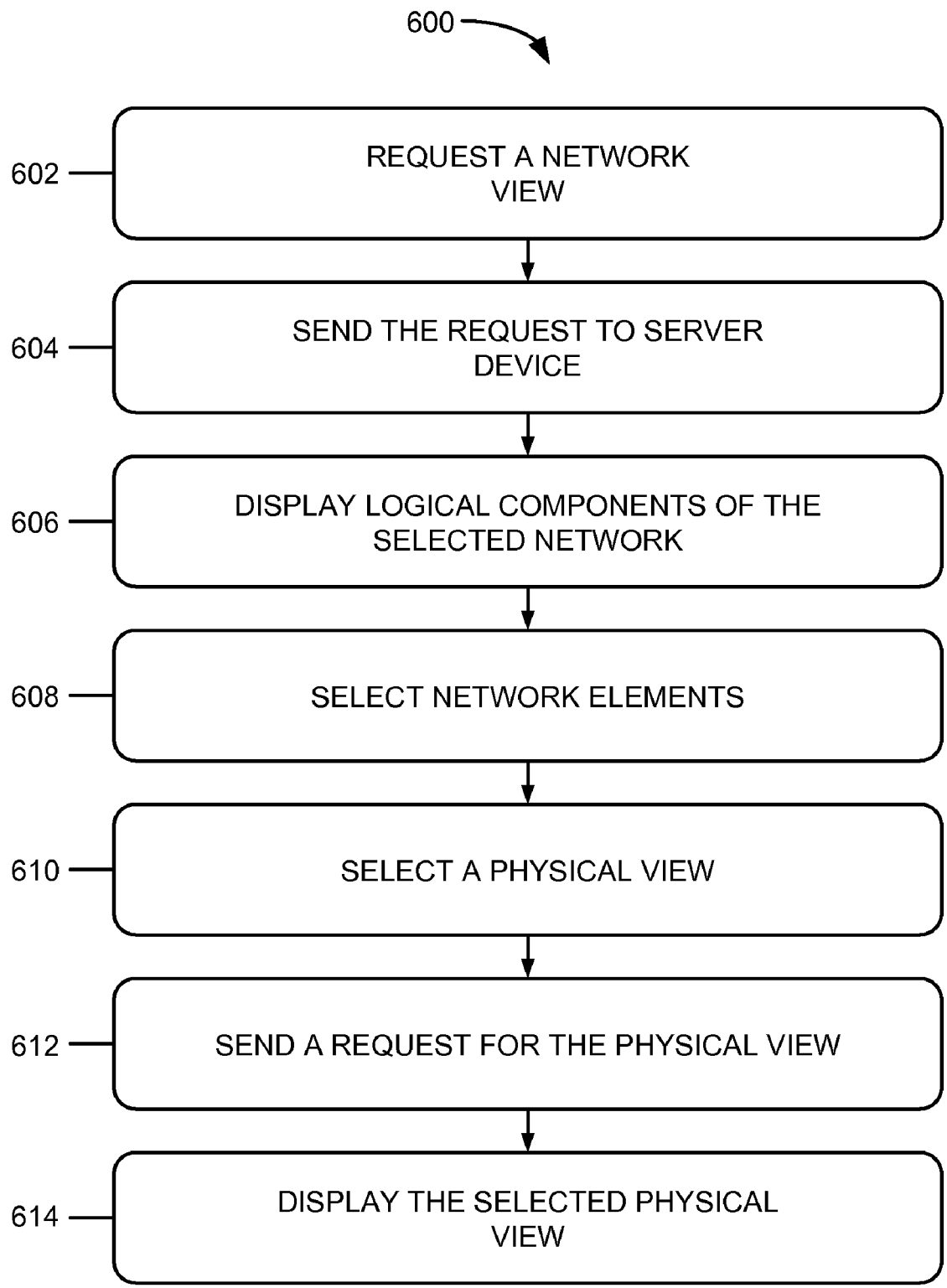
FIG. 6 shows an exemplary process for displaying the connectivity of network elements in the physical layer of a network.

The above paragraphs describe system elements that are related to displaying connectivity of network elements in the physical layer of the OSI reference model, such as client device 102, server device 104, browser 404, ICON server 504, and database 508. FIG. 6 depicts an exemplary process that is capable of being performed on client device 102.

As shown in FIG. 6, process 600 may start at block 602, where a particular network view may be requested. The request may be made in various ways. For example, if ICON client 406 is implemented as a browser plug-in, a user input for the network view may be received and sent as part of a request for the view to ICON server 406.

Figure 7:
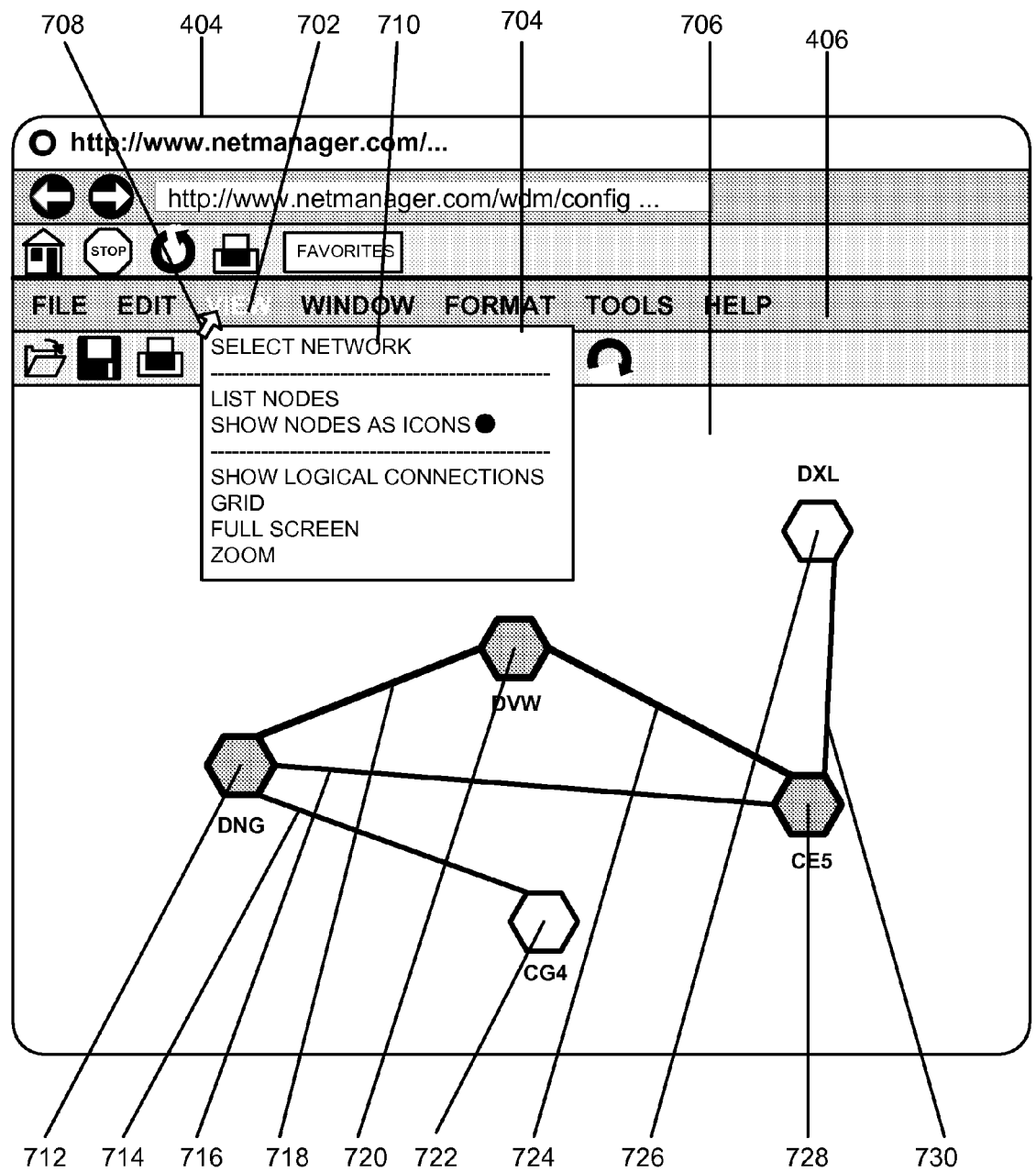
FIG. 7 shows a diagram of an exemplary Integrated Connectivity of Networks (ICON) client that is attached to a browser.

FIG. 7 shows a diagram of an exemplary ICON client 406 that operates in conjunction with browser 404. In FIG. 7, ICON client 406 shows optical network 200. In FIG. 7, a user may select VIEW menu item 702 from ICON client 406 to trigger a submenu 704. Submenu 704 may allow a user to select one of many networks (not shown) that can be viewed in pane 706, by moving a cursor 708 over SELECT NETWORK submenu item 710 and selecting item 710 (e.g., clicking on it using a mouse). The selection may create a request for a network view.

In different implementations, the available networks to choose from may be simply listed as items in a web page. In such implementations, the request may be made by selecting one of the available networks and submitting the selection via browser 404.

At block 604, the request may be sent to server device 104. If ICON server 506 is implemented on the same device as ICON client 406 and/or if ICON client 406 and ICON server 506 are integrated into a single application, block 604 may be omitted. In response to the request, server device 104 may send information related to the selected network to ICON client 406. In one implementation, ICON server 506 may send all available information about the network and, in another implementation, ICON server 506 may send only information that is necessary for displaying the selected network at ICON client 406.

Logical components of the selected network may be displayed at ICON client 406 (block 606). In FIG. 7, the logical components are illustrated as network elements 712-730. Network elements 712-730 may correspond to optical systems 202 and paths 204.

At block 608, network elements may be selected. In FIG. 7, the selected network elements are shown as devices 712, 718, 720, 724, and 728. If ICON client 406 is implemented as a web page, the selection may be made via graphical user interface components that are available in hypertext markup language (HTML). In other implementations, the components may be selected by entering text, using checkboxes, and/or other graphical user interface (GUI) mechanisms for accepting user inputs.

Figure 8:
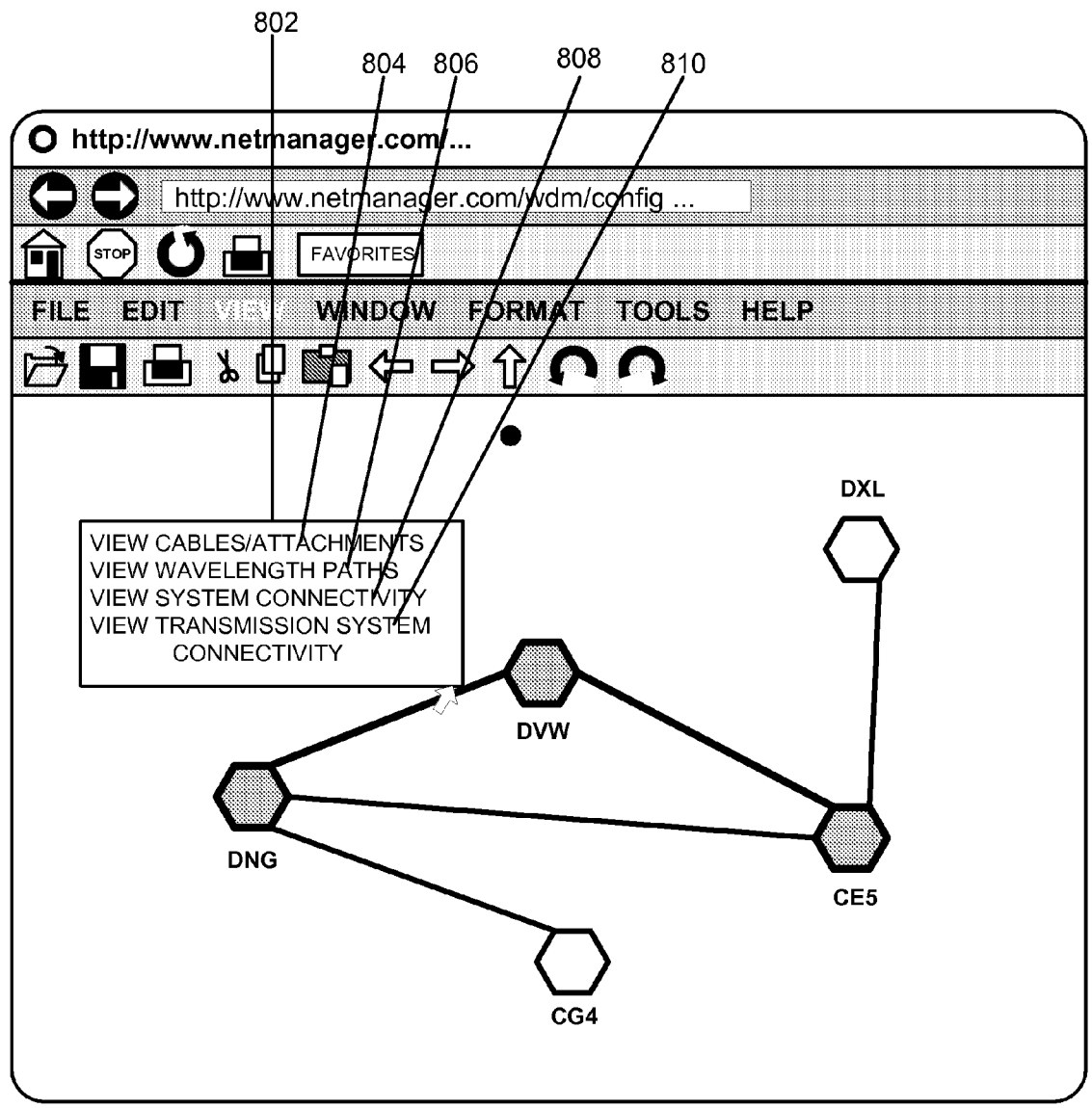
FIG. 8 shows selecting a physical view by using a floating menu in the ICON client of FIG. 7.

A physical view may be selected (block 610). As an example, FIG. 8 shows selecting an exemplary physical view by using a floating menu 802. If a cursor is placed above one of the selected network elements and a network element is selected (e.g., mouse is right-clicked), floating menu 802 may be displayed. Floating menu 802 may include the following menu items, each of which represents a physical view: VIEW CABLES/ATTACHMENTS 804, VIEW WAVELENGTH PATHS 806, VIEW SYSTEM CONNECTIVITY 808, and/or VIEW TRANSMISSION SYSTEM CONNECTIVITY 810. The desired physical view may, for example, be selected by positioning the mouse cursor over the menu item that represents the desired physical view and left-clicking the mouse. In many implementations, additional or different views may be available for selection.

While FIG. 8 shows selecting the physical view using ICON client 406 that is implemented as a browser plug-in, other implementations are possible. For example, in block 608, if ICON client 406 is implemented as a dynamic or static web page, a physical view may be selected on the web page.

A request for the physical view may be sent (block 612). The request may include information about network elements that are selected at block 608 (e.g., end point devices), as well as information about the selected physical view at block 610. If ICON client 406 and ICON server 506 are implemented as a single application that is hosted on a single device, the block 612 may be omitted.

If the request for the physical view is received at ICON server 506, ICON server 506 may prepare and send information that may be displayed at ICON client 406. Depending on the specific physical view that is requested, ICON server 506 may prepare the information in different ways. For example, if VIEW CABLES/ATTACHMENTS 804 is selected, ICON server 506 may identify an end point device that is specified in the request and obtain a list of physical devices (e.g., a network interface, an add-drop multiplexer, an optical fiber, etc.) that the end point device may contain, by searching database 508. For each device in the list, ICON server 506 may perform additional searches for physical devices that may be attached or connected to the device and are able to form a path through which a signal can flow. The process of finding a chain of devices that form a signal path may continue until another end point that is specified in the request may be reached and identified. In another example, given any intermediate device (e.g., a device that is not an end point device), ICON server 506 may be able to identify all devices that may relay the signal. The list of interconnected devices that form signal paths and related information may be sent to ICON client 406.

In determining the devices that form signal paths, ICON server 506 may intelligently apply different constraints on different devices through which a signal may flow. As explained above, the constraints may involve different physical factors, such as physical locations of devices, device/component types, device bandwidths/wavelengths, interconnections, etc.

In the above, ICON server 506 may include not only the intelligence to locate and/or identify a specific physical layer 1 device, but also comprehend different types of dependencies between systems to identify other devices may be affected by the specific device. For example, if the network operator receives an alarm, the network operator may use ICON client/server to recognize that an add-drop multiplexer has failed and may view regenerators that are affected by the failure. If the add-drop multiplexer has an automatic protection switching, the operator may not take an immediate action, because the automatic protection switching may restore the network to its original configuration after any instabilities pass.

Referring back to FIG. 8, if a different menu item in floating menu 802 is selected, ICON server 506 may repeat a similar search process as that for VIEW CABLES/ATTACHMENTS 804. For example, if VIEW WAVELENGTH PATHS 806 is selected, ICON server 506 may obtain a list of interconnected devices which relays information at a single carrier wavelength from one end point to the other. If VIEW SYSTEM CONNECTIVITY 808 is selected, ICON server 506 may obtain a list of systems that are in a path between the end points. If VIEW TRANSMISSION SYSTEM CONNECTIVITY 810 is selected, ICON server 506 may obtain a list of light transmission equipments (LTE) that are in the path between the end points.

Figure 9:
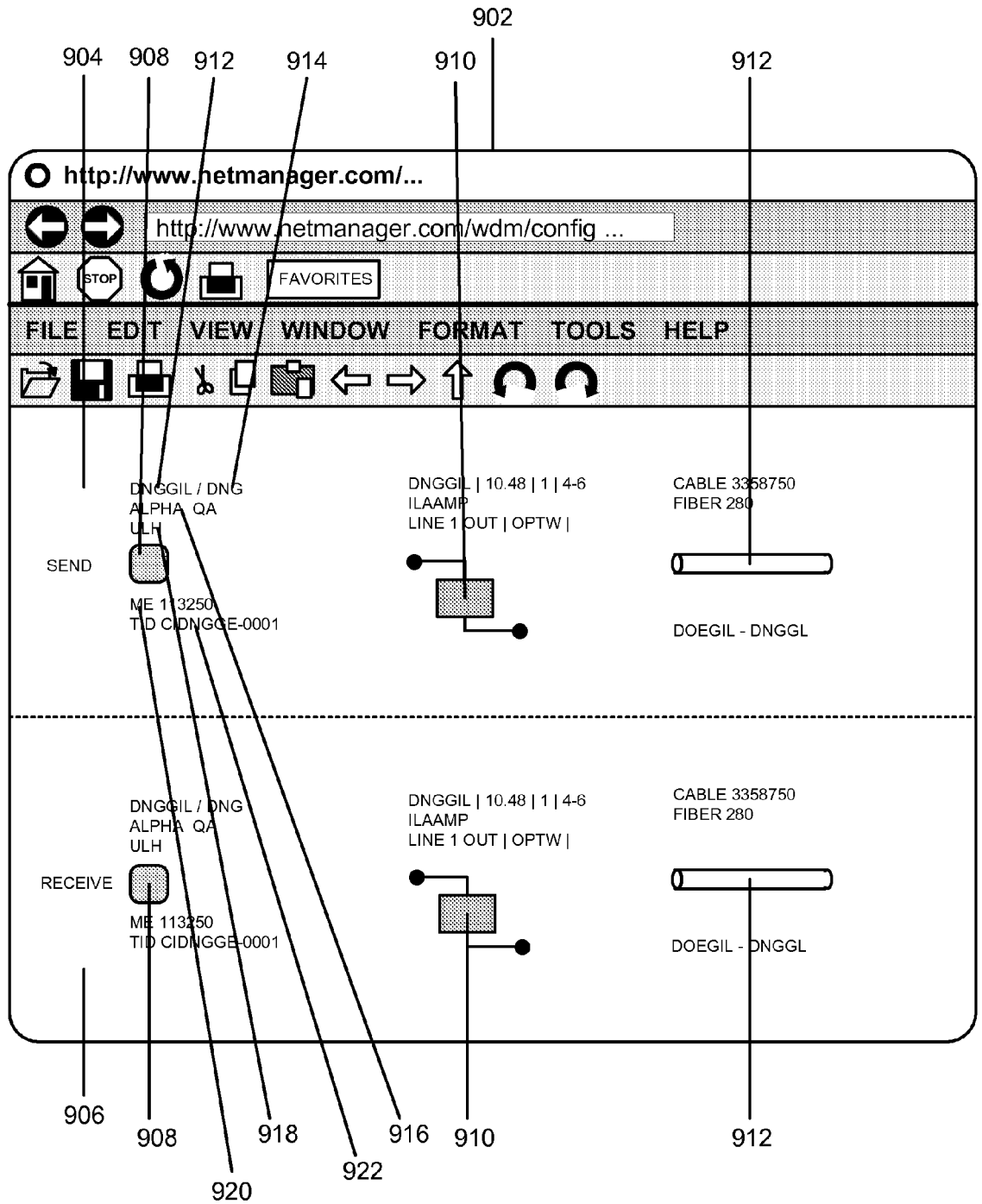
FIG. 9 shows a diagram of an exemplary physical view of a network fiber connectivity that may be displayed by the ICON client of FIG. 7.

At block 614, the selected physical view may be displayed. The physical view may be based on the list of devices and the related information that are received by ICON client 406. FIG. 9 shows a diagram of an exemplary physical view that may be displayed by ICON client 406 based on information that is received by ICON client 406 if VIEW CABLES/ATTACHMENTS 804 is selected. As shown, browser window 902 may include a SEND pane area 904, in which some of devices for sending information from selected device 712 (FIG. 7) to selected device 714 may be displayed, and a RECEIVE pane area 906, in which some of devices for receiving information at selected device 712 from selected device 720 may be displayed.

In FIG. 9, SEND pane area 904 and RECEIVE pane area 906 are depicted as showing an Ultra Long Haul (ULH) device 908 that has the ability to send optical signals over a long distance, interface device 910 at which optical signals are conveyed to one or more cables, and a cable 912 through which optical signals may be transmitted/received. In practice, SEND pane area 904 and RECEIVE pane area 906 may show different components, depending on devices that are included in the selected network elements at block 608 and depending on the requested physical view. In some implementations, the panes may be replaced with sub-windows that may be cascaded or tiled.

SEND pane area 904 and RECEIVE pane area 906 may show details about physical devices. For example, in FIG. 9, SEND pane area 904 shows details about ULH device 908, such as device name 912 (e.g., DNGGIL in FIG. 9), a location code 914 (e.g., DNG), an internal system identifier 916 (e.g., ALPHA: QA, which may identify the system of which ULH device 908 is part), a device type code 918 (e.g., ULH, which may identify the type of device), an equipment identifier 920 (e.g., ME 113250), and a target identifier 922 (e.g., TID CIDNGGIL-0001, which may be provided by the system and used by ICON client/server 406/506 to precisely locate the device). In many implementations, different types of details may be provided by ICON server 506 to ICON client 406 for display purposes (e.g., a port number). In addition, a desired level of details may be specified by a user and displayed through various menus and menu items.

Figure 10:
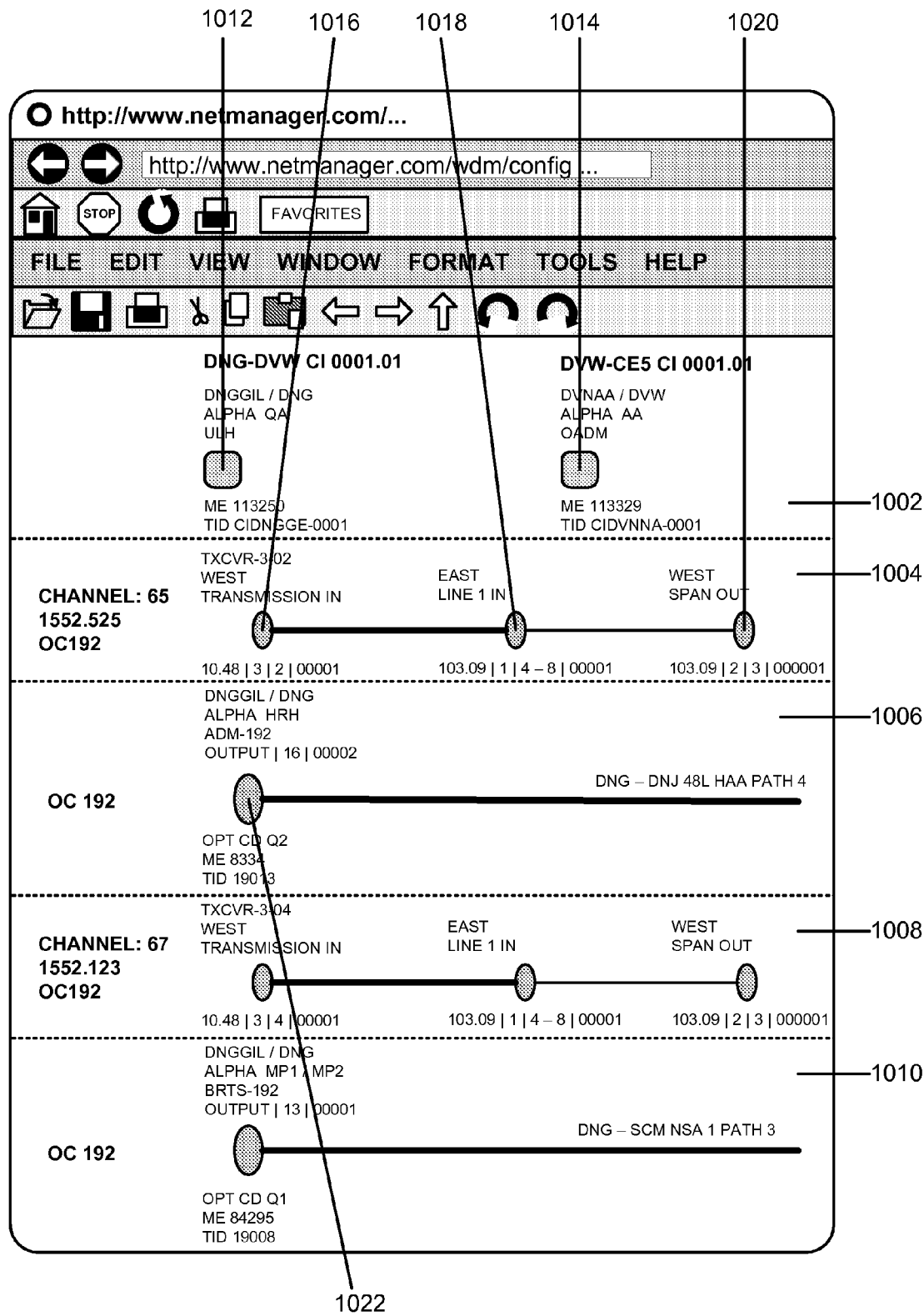
FIGS. 10-12 show diagrams of other exemplary physical views that may be displayed by the ICON client.

FIG. 10 shows a diagram of an exemplary physical view that may be displayed by ICON client 406 if VIEW WAVELENGTH PATHS 806 (FIG. 8) is selected. As shown, the physical view for VIEW WAVELENGTH PATHS 806 may include system pane 1002, channel panes 1004 and 1008, and equipment panes 1006 and 1010. Depending on implementation and use of ICON client 406, the physical view may include additional, fewer, or different panes than those illustrated in FIG. 10. For example, ICON client 406 may show more panes for additional channels.

System pane 1002 may illustrate a high level view of devices via which a single wavelength channel (e.g., a channel at 1552.525 nanometers) is maintained between the end points that are specified in the request. In FIG. 10, system pane 1002 shows devices 1012 and 1014 as supporting the path between the end points. Channel pane 1004 may illustrate specific interfaces and/or ports through which the wavelength channel is provided. In FIG. 10, channel pane 1004 shows a transceiver 1016 at equipment 1012 and ports 1018 and 1020 at equipment 1014. Equipment pane 1006 may illustrate physical layer transmission/reception equipments (e.g., an add-drop multiplexer) that carry the wavelength channel. In FIG. 10, equipment pane 1006 shows an add-drop multiplexer 1022 for a SONET. Channel pane 1008 and equipment pane 1010 shows similar information as channel pane 1004 and equipment pane 1006, but for a wavelength that is different from that the wavelength for channel pane 1004 (e.g., 1552.123 nanometers). As in FIG. 9, the panes in FIG. 10 may show device specific information.

Figure 11:
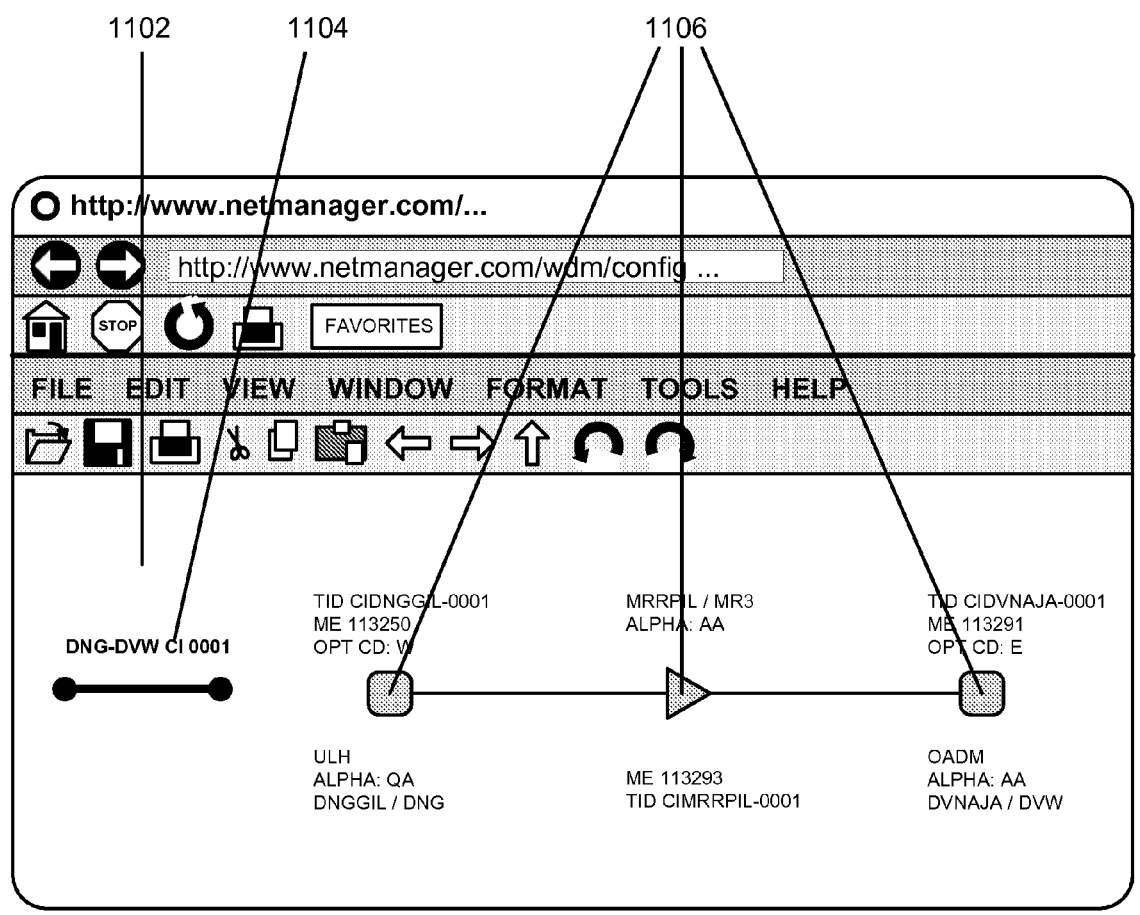

FIG. 11 shows a diagram of an exemplary physical view that may be displayed by ICON client 406 if VIEW SYSTEM CONNECTIVITY 808 (FIG. 8) is selected. System pane 1102 may illustrate a high level view of devices in a path between the end points that are specified in a request from ICON client 406 to ICON server 506. As shown, system pane 1102 illustrates a path 1104 and devices 1106. Path 1104 may identify devices at the end points. Devices 1106 in FIG. 11 may not only include devices that pertain to a single carrier wavelength as in FIG. 10, but devices that may support many carrier wavelengths.

Figure 12:
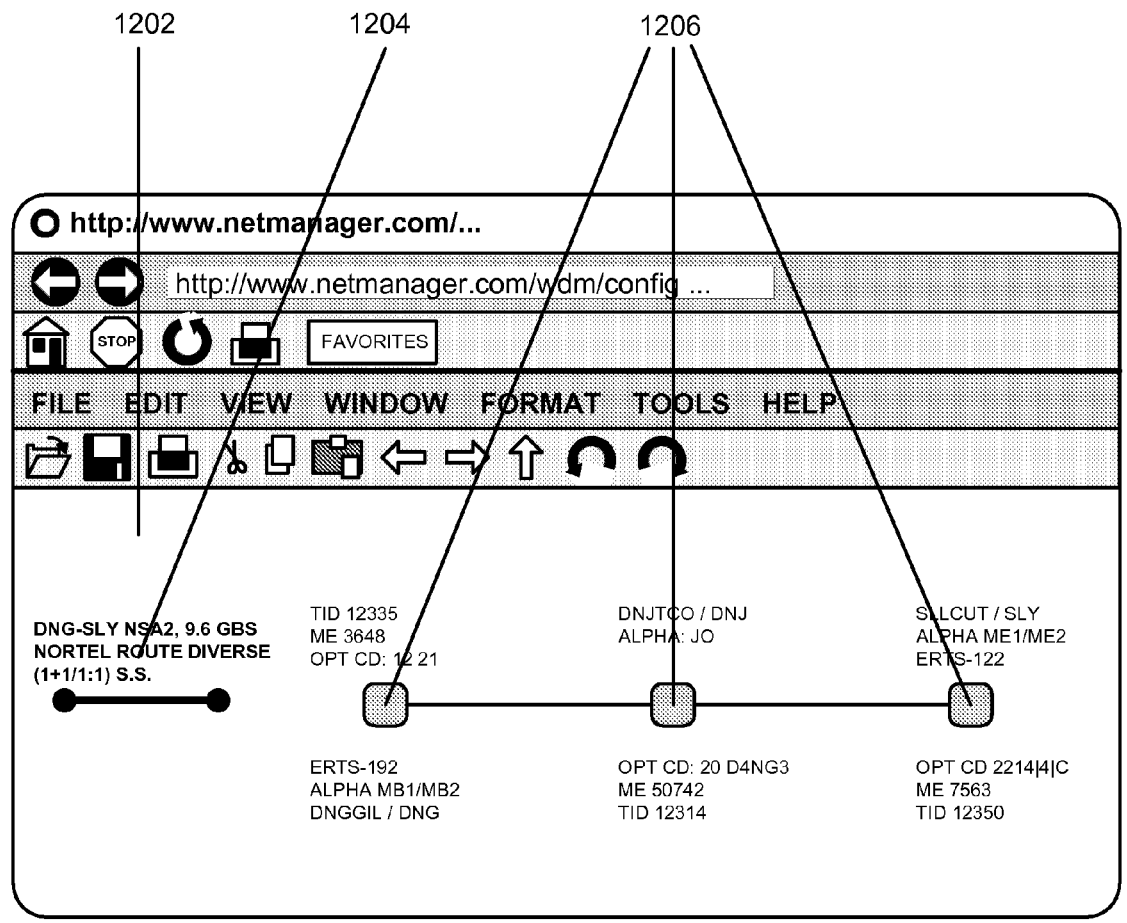

FIG. 12 shows a diagram of an exemplary physical view that may be displayed by ICON client 406 if VIEW TRANSMISSION SYSTEM CONNECTIVITY 810 (FIG. 8) is selected. Equipment pane 1202 may illustrate a high level view of light transmission equipments (LTE) in a path between the end points that are specified in a request from ICON client 406 to ICON server 506. As shown, equipment pane 1202 illustrates a connected system 1202 and LTEs 1406. Connected system 1202 may identify a line terminating system for the end points. LTEs 1206 may include light regenerating equipments (LRE) (e.g., devices that regenerate degraded optical signals) and/or line terminating equipments (LTE) that provide terminations for optical paths.

As with the physical views that are associated with VIEW CABLES/ATTACHMENTS 804 (FIG. 8) and/or VIEW WAVELENGTH PATHS 806, the physical views in FIGS. 11 and 12 may be displayed as web pages or may be implemented using different graphical user interface (GUI) components. In some implementations, the user interfaces may be text based.

Many changes to the components and the process for displaying connectivity of network elements in the physical layer of OSI reference model as described above may be implemented. In some implementations, ICON client 406 may receive all device information related to a network if it sends a request for a view to ICON server 506. In such implementations, if a user changes a view of the selected network elements, ICON client 406 may manipulate locally cached information to provide the user with a desired view, as information that is necessary to graphically present the view may already have been received. In other implementations, ICON client 406 may receive only information that is related to a selected set of network elements. In still other implementations, only information that is necessary to display a particular view may be received.

In many implementations, ICON client 406 may incorporate the ability to create information about a new physical device in a network, and/or to edit a particular piece of information related to a physical device. Any information created or modified at ICON client 406 may be sent to ICON server 506, which may modify database 508. Furthermore, ICON client 406 may provide the ability to compile information about the devices in different connectivity views as a report (e.g., an engineering and disaster recovery report, such as a fiber connectivity report).

The following example illustrates processes that may be involved in displaying connectivity network elements in the physical layer of OSI reference model in accordance with implementations described with respect to FIGS. 1-5. The example is consistent with the exemplary process described above with reference to FIG. 6.

In the example, assume that a user has a personal computer (e.g., client device 102) that is attached to a network (e.g., network 106) and that server device 104 (e.g., a host for ICON server 506) is also attached to network 106.

The user uses browser 404 and ICON client 406, which is implemented in the form of a browser plug-in to view the physical layer of a network (FIG. 2). The user selects a network by using VIEW menu item 702, selects devices 712, 718, 722, 724, and 728, and requests a view for VIEW CABLE/ATTACHMENTS 804 (FIG. 8), by invoking and using the floating menu 802.

In response to the request for the physical view, ICON server 506 may obtain a list of devices from one end point (e.g., device 712) to the other end point (e.g., device 728) that are specified in the request. To obtain the list, ICON server 506 may intelligently apply constraints on different physical factors, such as physical locations of devices, types of devices or equipment, interconnections, etc.

In FIG. 9, interface 910, and a cable 912 are illustrated as some of devices that are interconnecting the end points. The full list of interconnected devices and related information may be sent to ICON client 406, which displays the selected physical view.

The above example illustrates how a physical view of a network may be displayed. Different views may convey different types of information. In VIEW CABLE/ATTACHMENTS view, devices represent elements through which actual transmitted and received signals may flow in the physical layer. The view may help in determining a list of all devices that are associated with and connected to a given fiber. In VIEW WAVELENGTH PATHS view, devices that are interconnected through a single wavelength path may be determined. In VIEW SYSTEM CONNECTIVITY view, interconnected devices in a network can be traced from one designated end point to the other designated end point. Using VIEW TRANSMISSION SYSTEM CONNECTIVITY view, a port of a device can be traced to light transmission equipments, including regenerators.

In the above, the different types of information that can be displayed by a client application may be obtained by a server application. The server application may obtain the information by intelligently applying constraints on different physical factors, such as physical locations of devices, types of devices, architecture of the devices, interconnections of components in the devices, bandwidths/wavelengths of the devices, etc.

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks have been described with regard to the process illustrated in FIG. 6, the order of the blocks may be modified in other implementations. For example, block 610 may be performed before block 604. Further, non-dependent blocks may represent blocks that can be performed in parallel. For example, blocks 602-614 that are performed for one ICON client 406 may be independent of blocks 602-630 for a second ICON client 406 and, therefore, may be performed in parallel to blocks 602-630 for the second ICON client. Further, it may be possible to omit blocks, such as block 606.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    sending a request for a physical view of a network path that includes physical devices between two end points;
    receiving, in response to the request, information obtained by:
        performing a lookup of the physical devices in the network path, in accordance with the requested physical view, using different types of dependencies between devices to perform lookups of other devices, and
        determining different paths of multiple single wavelength carrier signals through different sets of components of the physical devices, based on:
            the lookup,
            interconnectivity between the different sets of components in the physical devices,
            physical locations of the different sets of components, and
            a plurality of different carrier wavelengths corresponding to a same bit rate with the different sets of components; and
    displaying:
        a list of the physical devices in an order that the physical devices are physically connected from one of the two end points to another of the two end points,
        at least a portion of the different sets of components with different single wavelength carrier signals of the multiple single wavelength carrier signals, and
        at least some physical layer equipment information with each of the different single wavelength carrier signals for the same bit rate.

2. The method of claim 1, wherein sending a request includes:
    sending a request for a physical view of one or more of cables, fibers, or network interfaces that connect the two end points.

3. The method of claim 1, wherein sending a request includes:
    sending a request for a physical view of devices that carry a particular single wavelength carrier signal from the one of the two end points to the other of the two end points.

4. The method of claim 1, wherein sending a request includes:
    sending a request for a physical view of systems that connect the two end points.

5. The method of claim 1, wherein sending a request further includes:
    sending a request for a physical view of light transmission equipment that connects at least some of physical devices between the two end points.

6. The method of claim 1, wherein displaying the list of physical devices includes:
    displaying, for each device in the list, at least one of:
    a target identifier of the device, a physical location identifier, a device type identifier, an identifier for a system in which the device is hosted, a port number, or a position code.

7. A method comprising:
    receiving a request for a physical view of a network path;
    performing a lookup of physical devices in the network path, in accordance with the requested physical view, using different types of dependencies between devices to perform lookups of other devices;
    obtaining a list of the physical devices based on:
        the lookup,
        interconnectivity of different sets of components, in the physical devices, which form different paths for carrying multiple single wavelength carrier signals through the physical devices,
        physical locations of the different sets of components, and
        a plurality of different carrier wavelengths corresponding to a same bit rate with the different sets of components; and
    conveying the list of physical devices to a client that displays:
        the physical devices in an order that the physical devices are physically connected from one of two end points in the network path to another of the two end points,
        at least a portion of the different sets of components with different single wavelength carrier signals of the multiple single wavelength carrier signals, and
        at least some physical layer equipment information with each of the different single wavelength carrier signals for the same bit rate.

8. The method of claim 7, wherein receiving a request includes:
    receiving a request for a physical view of the physical devices that carry a particular wavelength carrier signal from the one of the two end points to the other of the two end points.

9. The method of claim 7, wherein conveying the list of physical devices includes:
    sending, for each of the physical devices, information about a physical location, device type, or a port number.

10. A device comprising:
    a client device configured to:
        send a request for a physical view about network devices that connect two end points of a network path,
        receive, in response to the request, information obtained by:
            performing a lookup of the network devices in the network path, in accordance with the requested physical view, using different types of dependencies between devices to perform lookups of other devices, and
            determining different paths of multiple single wavelength carrier signals through different sets of components of physical devices in the network path, in accordance with:
                the lookup,
                the request for the physical view,
                physical locations of the different sets of components in the physical devices, and
                a plurality of different carrier wavelengths corresponding to a same bit rate with the different sets of components; and
        display:
            the complete list of the physical devices in an order that the physical devices connect the two end points,
            at least a portion of the different sets of components with different single wavelength carrier signals of the multiple single wavelength carrier signals, and
            at least some physical layer equipment with each of the different single wavelength carrier signals for the same bit rate.

11. The device of claim 10, wherein the received information includes:
    a particular set of components in the physical devices that carries a particular wavelength carrier signal from one of the two end points to another of the two end points.

12. The device of claim 10, wherein the different sets of components include:

one or more of port and interface that carry a single wavelength carrier signal from one of the two end points to another of the two end points.

13. The device of claim 10, wherein the at least some physical layer equipment includes:

one or more of physical layer transmission and reception equipment associated with the each of the different single wavelength carrier signals for the same bit rate.

14. The device of claim 10, wherein the received information includes:

a list of light transmission equipment.

15. The device of claim 10, wherein the received information includes, for each of the physical devices in the complete list, one or more of:

target identifier of the physical device, a physical location identifier, a device type identifier, an identifier for a system in which the physical device is hosted, a port number, or a position code.

16. The device of claim 10, wherein the complete list of physical devices includes a list of synchronous optical network (SONET) equipment.

17. The device of claim 10, wherein the client includes a browser.

18. The device of claim 10, wherein the client further includes a browser plug-in.

* * * * *